Nov. 6, 1934.  D. A. BARNETT  1,979,435
TRANSMISSION SYSTEM
Filed July 20, 1932  2 Sheets-Sheet 1
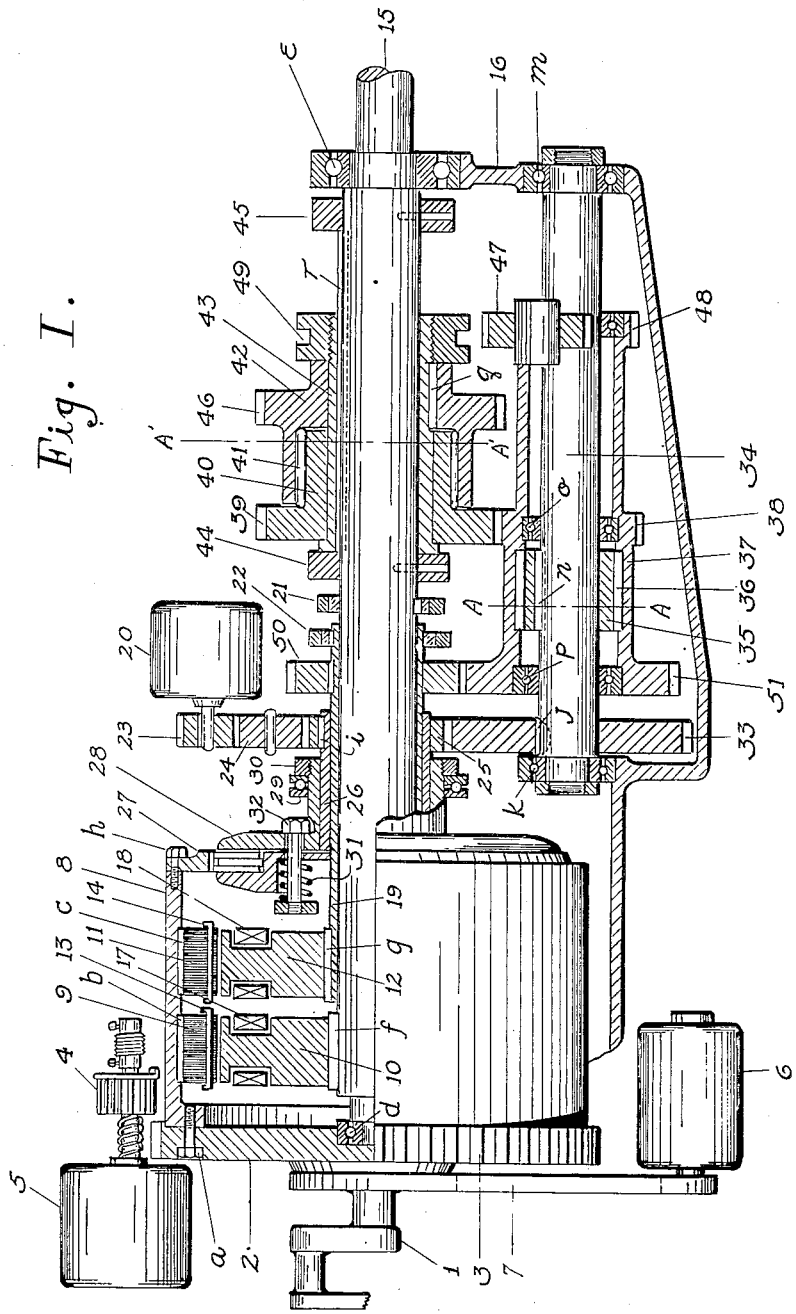
INVENTOR.
David A. Barnett
BY Roderick Malcolm
ATTORNEY.

Nov. 6, 1934.   D. A. BARNETT   1,979,435
TRANSMISSION SYSTEM
Filed July 20, 1932   2 Sheets-Sheet 2
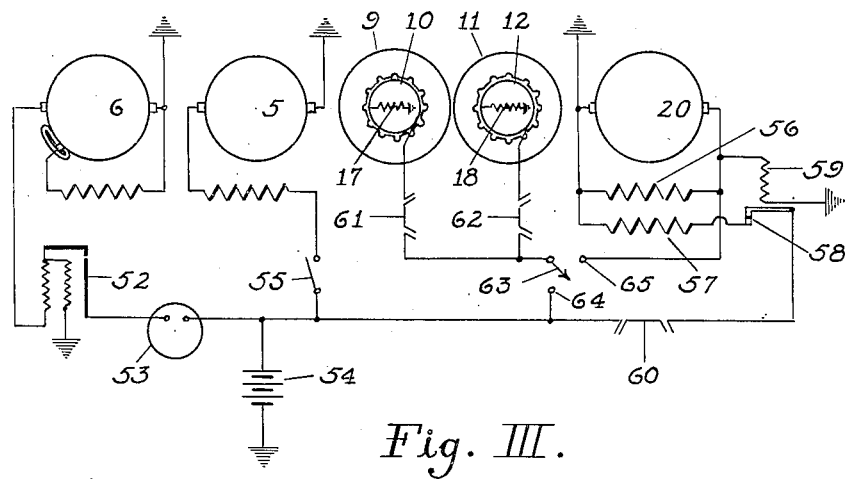
Fig. III.
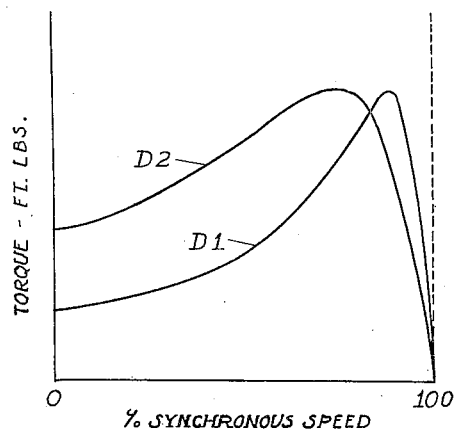
Fig. IV.
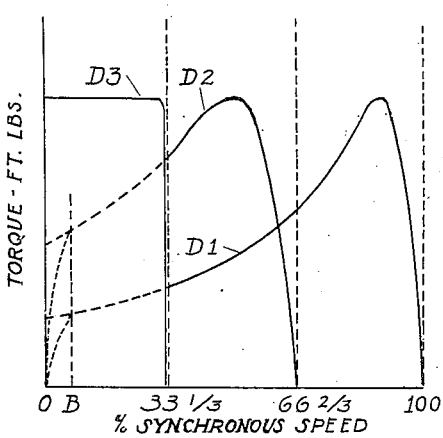
Fig. V.
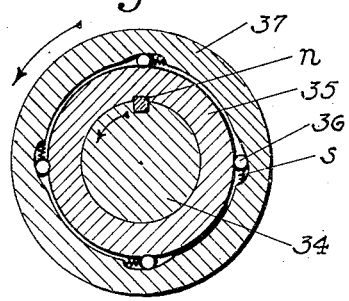
Fig. II.
INVENTOR.
David A. Barnett
BY Roderick Malcolm
ATTORNEY.

Patented Nov. 6, 1934

1,979,435

UNITED STATES PATENT OFFICE 1,979,435

TRANSMISSION SYSTEM

David A. Barnett, Hamden, Conn.

Application July 20, 1932, Serial No. 623,524

7 Claims. (Cl. 172—284)

This invention relates to improvements in power transmission apparatus, particularly to apparatus adapted for use in automotive devices, and has special reference to the provision of means whereby a transfer of power is accomplished without any manual shifting of gears, except for a change from forward to reverse drive or vice versa.

The transmission system of my present invention is of the induction torque unit type disclosed in United States Patents No. 1,794,613 and No. 1,922,804 to J. A. Heany and is an improvement upon the transmission system disclosed in my co-pending application Serial No. 623,523, filed July 20, 1932.

In the transmission system, as described in the Heany patent, a mechanical gear reduction mechanism and an induction unit are connected in parallel between the prime mover and driven shaft. The arrangement is such that the gear reduction mechanism tends to drive the prope'ler shaft at a speed greatly reduced from that of the engine, while the induction unit tends to drive the propeller shaft at approximately engine speed so that when the torque of the induction unit is great enough the load is taken up directly by the induction unit, the propeller shaft being permitted to turn faster than the reduction gear by means of an overrunning clutch associated therewith. A mechanical gear reduction mechanism when engaged provides a rigid coupling between prime mover and driven shaft.

In my co-pending application Serial No. 623,523 there is no rigid coupling between prime mover and driven shaft, a second electro-magnetic induction unit taking the place of the mechanical gear reduction mechanism of the Heany patent.

In both of the above mentioned systems a manually operated shift is necessary for selective gear drive between first and second speeds.

An object of my invention is to provide a power transmission system wherein manual shifting is required only for change from neutral to forward or reverse drive.

Another object of my invention is to provide a multiple induction drive in association with a mechanical gear unit so arranged as to supplement each other and capable of automatic operation over a wide range of speed with extreme flexibility.

Another object of my invention is to provide power transmission apparatus which, in comparison with the usual arrangements, may utilize an engine of less maximum horse-power and nevertheless be operable at high torque speed and relatively greater efficiency.

Still another object of my invention is to provide a power transmission system having a plurality of independently operating drive units whereby efficient and otherwise satisfactory operation is obtained although the vehicle in which the system is incorporated is subject to frequent starting and stopping conditions.

My invention contemplates a power transmission system wherein power from a prime mover is transmitted to a driven shaft by reason of automatic operation of a mechanical clutch and a plurality of electro-magnetic induction units. The mechanical clutch is arranged to impart motion to the driven shaft through a gear reduction mechanism, the first of the induction units is arranged to impart motion to the driven shaft through a second gear reduction mechanism. A second induction unit is adapted to impart motion to the driven shaft directly and at substantially engine speed. The several units are automatically cut in and out according to the relative speed of the units and driven shaft, and also in accordance with the torque required by the shaft in proportion to that relatively transmitted by the units.

Considered from one aspect, the invention lies in the utilization of a plurality of electro-magnetic induction units in association with a mechanical or friction clutch unit and with the automatic interlocking and operating features as hereinafter more fully described.

The novel features which I believe to be characteristic of my invention are set forth with particularity in the appended claims. My invention itself, however, both as to its organization and method of operation, together with further objects and advantages, will best be understood by reference to the following description taken in connection with the accompanying drawings wherein:

Figure I is a longitudinal sectional view of a power transmission assembly within my invention.

Figure II is an enlarged cross-sectional view of an automatic one way clutch, taken on the line A—A of Figure I.

Figure III is a schematic wiring diagram showing the several electrical connections required for the apparatus of my invention, but with the usual ignition, lighting and auxiliary circuits omitted.

Figures IV and V are torque speed curves representative of the induction units used and the application of these curves to operation of the system.

Referring in detail to Figure I, 1 designates the engine, or prime mover; 2 is an end frame having gear 3 so arranged as to co-operate with pinion 4 of self-starter 5. Generator 6 is coupled to engine 1 by a belt or chain 7, as in standard practice.

A cylindrical supporting frame 8 is rigidly fixed to end structure 2 by bolts $a$. The electrically secondary members 9 and 11 of the dual induction unit are rigidly fixed to supporting frame 8 by keys $b$ and $c$. These members are preferably of laminated construction, as shown, and are each provided with slots near the inner circumferences with the electrical windings 13 and 14 mounted respectively therein. Windings 13 and 14 may be of squirrel cage or other suitable construction, winding 14 being preferably of somewhat higher resistance than that of 13.

The driven shaft is 15. It is concentrically mounted on end frame 2 by ball bearings $d$, and is further supported by ball bearings $e$ on outer supporting frame 16.

The electrically primary member 10 of the first induction unit 9—10 carries an exciting coil 17, and is fixed rigidly to driven shaft 15 by key $f$.

Primary member 12 of the second induction unit 11—12 also carries a coil, 18. The primary 12 may be similar in all respects to primary 10, except that instead of being mounted directly upon shaft 15 it is rigidly fastened, as by key $g$, to sleeve 19. Sleeve 19 is free to revolve on shaft 15.

Electric current from exciter 20 may be led to primary coils 17—18 through slip rings 21 and 22, in which case 21, in electrical association with primary coil 17, is fixed directly on shaft 15, and slip ring 22, in electrical association with coil 18, is mounted on sleeve 19. Suitable slots, not shown, may be provided in shaft 15 and in sleeve 19 for carrying the electrically conductive leads from slip rings 21 and 22 to coils 17 and 18.

Exciter 20 may be driven by means of a gear 23, driving through idler 24, meshing with gear 25 on sleeve 26.

Mounted on the outer end of supporting frame 8, and rigidly fixed thereto, as by bolts $h$, is the primary member 27 of a friction or other suitable mechanical type clutch.

Sleeve 26, arranged to revolve freely on sleeve 19, carries the secondary member 28 of the friction clutch 27—28. Operation of the mechanical clutch unit is effected through a suitable lever mechanism, not shown, operating against bearings 29, and so through stop 30 and against the tension of spring 31 and guide bolt 32 in the usual manner.

Gear 25, fixed to sleeve 26 by key $i$, meshes with gear 33, which is fixed to countershaft 34 by key $j$. Countershaft 34 is suitably supported in frame 16 by bearings $k$ and $m$.

Rigidly fastened to countershaft 34 by key $n$ is the primary member 35 of a roller clutch, through which engagement with the secondary member 37 is acomplished by means of rollers 36. The secondary member, 37, is a shell-like member and is supported on countershaft 34 by ball bearings $o$ and $p$. The revolving shell-like secondary 37 of roller clutch 35—36—37 carries gear teeth 38, arranged to mesh with gear 39, imparting motion to the primary 40 of a second roller clutch mechanism. The secondary 42 of the second roller clutch 40—41—42 is driven by rollers 41. Secondary 42 is rigidly fixed, as by key $q$, to a sleeve, 43; the sleeve 43 is slidingly mounted on shaft 15 by means of key $r$, and its longitudinal movement is limited by stops 44 and 45.

The secondary member 42 carries gear 46, the shell-like member 37 of the first roller clutch assembly 35—36—37 carries a gear 48, meshing with idler 47, for reverse driving of shaft 15 through engagement with gear 46. Reverse driving is accomplished by manually shifting sleeve 43 by means of a lever mechanism, not shown, operating in groove 49.

The gear mechanism as so far described is in association with the mechanical clutch 27—28, and is designed for low or reverse speed driving. Parts in association with the second electro-magnetic induction unit 11—12, and arranged to effect driving at second speed, are as follows: Sleeve 19 carrying near its outer end gear 50, arranged to mesh with gear 51, gear 51 is part of the secondary or shell-like member 37 of roller clutch 35—36. As in low speed operation, energy is imparted to driven shaft 15 from 37 through 38, 39, 40, 41.

Unit 9—10 is the "high" or synchronous speed drive, member 10 being permanently affixed to driven shaft 15, as previously described.

Figure II is an enlarged cross-sectional view taken on the line A—A in Figure I of the automatic one-way clutch 35—36—37.

The countershaft is 34; rigidly fixed thereto by key $n$, and normally revolving in the direction of the arrow, is primary member 35. The secondary or shell-like member, 37, also normally revolves in the same direction as shaft 34. Interposed between primary 35 and secondary 37, and adapted to transfer energy therebetween when held in engagement by springs $s$, are rollers 36.

Roller clutch 40—41—42, operating on main shaft 15 if taken on the line A'—A' of Fig. I would be similar to the clutch 35—36—37 above described. It is to be particularly understood that I do not wish to be limited to the use of the particular type of overrunning clutch above described, as it will be apparent to those skilled in the art that any suitable automatic clutch may be substituted in either instance for the roller type clutch of Figures I and II.

Figure III is a wiring diagram of the electrical circuits adapted for use with the dual induction drive unit of my invention and shows a reverse current relay 52, ammeter 53, battery 54, and starting motor switch 55, in electrical association with the starting motor 5 and generator 6 of Figure I. Like characters represent corresponding parts in all figures; thus, the first induction drive assembly comprises secondary 9, primary 10, and primary exciting coil 17. The second induction unit comprises secondary 11, primary 12, and primary exciting coil 18. Direct current for coils 17 and 18 is provided by exciter 20. Additional features (not shown in Figure I) are the normally self-exciting shunt field 56, and auxiliary excitation winding 57 for exciter 20, shown connected through contact 58, having relay release coil 59, through safety switch 60 to battery 54. Switch 61 is provided in the circuit to field 17 and is operated in conjunction with a manual shift lever, not shown, for engagement in all forward driving but is open in the neutral position of the shift lever. Switch 62 in the circuit to field 18, and switch 60 in the auxiliary field circuit from the battery are operatively connected with the same manual shift lever, and are arranged for engagement in both forward and reverse driving positions, but are open in neutral. Selector switch 63 is provided for emergency excitation of the induction units from storage battery 54 through contact 64, instead of through the normal contact 65; in case of trouble or break-down, with exciter 20.

*Operation*

The manual shift lever, not shown, operating in groove 49 to move the assembly 40—41—42, mounted on sleeve 43, is set in neutral, whereby gears 38 and 39 are disengaged. Switch 55 is closed and the engine is started in the usual manner by means of starting motor 5. At this time switches 60, 61 and 62 are all open; the selective switch 63 is normally closed on contact 65. Friction clutch 28 is released by means of the clutch pedal, and for forward driving sleeve 43 is moved longitudinally on shaft 15, bringing gears 38 and 39 into mesh, and also closing switches 60, 61 and 62. With the clutch disengaged exciter 20 and shaft 15 are at a standstill. Releasing the clutch pedal engages friction clutch member 28 with the fixed member 27, thereby imparting movement through sleeve 26 and gears 25 and 33 to shaft 34 and primary member 35 of the first roller clutch assembly 35—36—37. Forward rotation of member 35, through roller 36, assisted by springs s, engages 35 with secondary 37, thereby driving through gears 38 and 39, the primary 40 of roller clutch assembly 40—41—42 mounted on sleeve 43. Sleeve 43 is keyed to shaft 15 by key r, as previously described, and rotation of sleeve 43 is accompanied by rotation of driven shaft 15.

With clutch members 27—28 disengaged exciter 20 will have its field magnetism partly built up by means of auxiliary field winding 57, which is in electrical asssociation with battery 54 through contacts 58 and switch 60.

With clutch 27—28 engaged, sleeve 26 carrying gear 25 will revolve, driving exciter 20 through 25, idler 24 and gear 23. Switches 60, 61, and 62 being closed, electrical energy generated by exciter 20 is led through slip rings 21 and 22 to induction unit secondary coils 17 and 18.

The electrical secondary members 9 and 11 fixed to frame 8 revolve at engine speed, due to this relatively forward movement (with respect to field members 10 and 12) and because of the magnetic field imposed on primary coils 17 and 18, a torque reaction, proportional to the field strength and magnetic slip is produced between the primary and secondary members of each unit. The torque produced on field 12 is transferred through sleeve 19 and gears 50 and 51 to the revolving secondary member 37 of the first roller clutch assembly 35—36—37, where it adds its effect to that already impressed on 37 through the friction drive 27—28 to countershaft 34; the two forces uniting to transmit torque to shaft 15 through 38, 39, 40, 41, 42, 43, as previously described. The torque reaction produced on field 10 is transferred directly to shaft 15, adding its increment in parallel with that derived from the other two sources. As the speed of engine 1 and driven shaft 15 increases, the speed and likewise the voltage generated by exciter 20 increases, thereby increasing the field strength produced by coils 17 and 18 and the resultant torque between 9—10 and 11—12 until the torque produced by the two units is sufficient to carry the load independent of the rigid coupling 27—28. As the speed of the driven shaft 15 increases, relative to engine speed, due to increased torque and decreased slip between elements 9 and 10 and elements 11 and 12, a point is reached at which primary 12 is running at approximately synchronous or engine speed and at this point the torque of unit 9—10 has increased sufficiently to take the entire load.

Referring now to Figure IV, the curves D1 and D2 are torque speed curves of two induction motors having the same maximum torque but differently distributed over the speed range because of different secondary resistance, as in my preferred construction.

In Figure V, D1 represents the torque speed curve of the first induction unit (9—10 of Figure I) and D2 the corresponding curve of the second induction unit (11—12 of Figure I), each being drawn with respect to its own synchronous speed, but differing in resepect to speed at the driven shaft by the amount of the interposed gear ratio.

If the full field strength were to be impressed on the induction unit, immediately upon engagement of the friction clutch the torque transmitted to the shaft by these units would be proportional to that shown by the solid lines of curves D1 and D2 of Figure V at zero per cent. synchronous slip or standstill. However, due to the fast that some time interval elapses between the building-up of the exciter generator voltage and rigid engagement of engine and shaft through the friction clutch and gear mechanism, the torque transmitted by the induction units will follow curves similar to the broken line curves of Figure V to some percentage of synchronous speed, as at B, from this point on continuing proportionally to the solid line curves.

Assuming, as in Figure V, a friction clutch gear ratio of 3 to 1 between prime mover 1 and shaft 15, and a constant impressed friction clutch torque proportional to straight line D3; the three torques will all operate in parallel at 33⅓% of synchronous speed, that is, at the point at which shaft 15 is running at one-third engine speed. At some speed, due to the rapid multiplication of torques D1 and D2, shell 37 will overrun countershaft 35 and continue to accelerate in speed, thereby accelerating shaft 15. Meanwhile countershaft 34 continues to run at one-third of engine speed, or relatively backward with respect to shell 37. The torque applied to shaft 15 during this period is the sum of direct torque D1 and the reduced gear torque D2, applied through the second gear reduction mechanism. The combined torque application condition continues until the second induction unit 11—12 reaches its own 100% synchronous speed, at which time shaft 15 will be driven at 66⅔% of engine speed and field 10 will be revolving at 66⅔% of the synchronous speed of the first unit 9—10. The torque D1, at this point, is sufficient to carry the entire load on shaft 15, so that the second roller clutch 40, 41, 42 overruns and gear 39 revolves less rapidly than shaft 15, and the field structure 12 revolves in approximate synchronism with the engine and carries no load. Under normal running conditions torque D1 continues to accelerate shaft 15 until it is revolving within a few per cent. of engine speed. This point is reached when the first unit is operating within a few per cent. of engine speed.

Assuming adverse conditions of travel to be encountered, that is, assuming that while running in direct drive and within a few per cent. of synchronous or engine speed, the car should start ascent of a steep grade, whether the engine is speeded ahead so that the car continues at the same speed, or whether the engine continues at its former speed (the car slowing down) the driven shaft will tend to slow down relative to the engine because of the increased load thereon. The torque supplied by the first unit (9—10) will slip back along the line of D1 until a condition of approximately one-third slip is reached following which any further tendency of shaft 15 to reduce in speed will cause the automatic one-way clutch assembly 40—41—42 on sleeve 43 to engage and the necessary additional torque to be applied by the second unit 11—12, the additional torque being proportional to that of curve D2.

Should the condition of travel be extremely severe, the slip of shaft 15 would continue to increase relative to the engine speed until a point corresponding to one-third engine speed, which is one-third of the synchronous speed of the first unit and one-half of the synchronous speed of the second unit, is reached, at which time any further tendency to slip would cause the first one-way clutch to engage member 37, thereby adding direct engine torque through the friction clutch 27—28, multiplied by the first gear ratio to that already supplied by the two induction torques. When the period of severe load is passed the induction torques again become predominant, shaft 15 gradually accelerating relative to the engine in the same manner as when starting from standstill.

One very real advantage of the transmission system of my invention is this: the engine continues to operate at a speed corresponding to high torque, resulting in most efficient engine performance, instead of being held down, or pulled back in speed, through rigid connection with the driven shaft, as in the usual system of transmission.

A further and important advantage is: that the relative engagement and disengagement of the different driving means take place at any actual speed of car or engine; the point of changeover being determined by the relative speed of the prime mover and driven shaft, the relative proportion of total torque transmitted by each of the three units, and the total torque required relative to engine output, to drive the car under the existing conditions of travel. Since almost all driving is done within the range of torque produced by the direct drive unit alone, or by combination of torque of the direct and second units, it is very seldom except at starting that there is any direct mechanical connection between prime mover and driven shaft, thereby eliminating the pulsations of engine explosion from being transferred to the car because of the cushioning effects of the induction drives. Road shocks usually transmitted from the wheels to the shaft and through the engine, are likewise eliminated, whereby riding comfort is appreciably increased. Except for the comparatively short period when in direct low gear drive, engine explosions are exerted against the cushioning effect of the induction drive (instead of against the inertia of the shaft and car, as in the usual mechanical transmission) whereby wear and general deterioration of bearings and various engine parts is greatly reduced.

While the embodiment herein described shows the induction units with their secondaries fastened to the engine and fields or electrical primaries connected with the driven parts, this arrangement might be reversed and the primaries fastened to the engine and secondaries to the driven parts, without departing from the spirit and scope of the invention. Again, instead of being constructed with electrically individual parts, either secondary or primary connected to the engine, one member might be made common to both units.

My invention is not necessarily limited to two induction units in association with a single mechanical unit, as the effective torque range could be still further extended should this be necessary or desirable (as in the case of heavy duty trucks) by the addition of still more induction units and increasingly more countershaft and one-way clutch assemblies.

As a number of possible embodiments may be made of the above invention, and as changes might be made in the embodiment set forth, without parting from the spirit and scope of the invention, it is to be understood that the foregoing is to be interpreted as illustrative and not in a limiting sense, except as required by the prior art and by the appended claims.

What is claimed is:

1. A transmission system comprising a driving shaft, a driven shaft, electro-magnetic means for transmitting power therebetween, second electro-magnetic means for transmitting additional power between said shafts at a reduced speed ratio, means independent of said first means and said second means for positively transmitting additional power between said shafts at another reduced speed ratio, and means for connecting and disconnecting said independent means and said second means between said shafts without affecting transmission of power by said first mentioned means.

2. A transmission system comprising a driving shaft, a driven shaft, electro-magnetic means for transmitting power therebetween, second electro-magnetic means for transmitting additional power between said shafts at a reduced speed ratio, means independent of said first means and said second means for positively transmitting additional power between said shafts at another reduced speed ratio, and means for connecting and disconnecting said independent means and said second means into and out of parallel driving relation with said first mentioned means.

3. A transmission system comprising a driving shaft, a driven shaft, an induction torque unit having elements connected to said shafts for transmitting power directly therebetween, a gear reduction mechanism, a second induction torque unit having an element connected to said driving shaft and an element connected to said mechanism for transmitting additional power between said shafts at a reduced speed ratio, a second gear reduction mechanism, means independent of said first unit and said second unit and having an element permanently connected to said driving shaft and an element permanently connected to said second gear reduction mechanism for positively transmitting additional power between said shafts at a fixed reduced speed ratio, and means for connecting and disconnecting said second unit and said independent means into and out of parallel driving relation with said first unit as determined by the torque requirement of said driven shaft, the relative speed of said shafts, and the individual torque transmitted by each of said power transmitting means.

4. A transmission system comprising a driving shaft, a driven shaft, an induction torque unit for transmitting power therebetween, a second induction torque unit for transmitting additional power between said shafts at a reduced variable speed ratio, means independent of said first unit and said second unit for positively transmitting additional torque between said shafts at a fixed reduced speed ratio, means for connecting said independent means and second unit into parallel driving relation with said first unit and operable to disconnect said independent means and said second unit when the respective torques thereof are reduced to zero.

5. A coupling for transmitting power at variable speeds between co-axial shafts comprising a plurality of induction torque units and a mechanical clutch, at least one of said induction units being positioned and arranged to transmit power at all forward speeds, another of said induction units and said mechanical clutch being positioned and arranged to transmit power between said shafts at different reduced speed ratios, means for connecting all of said power transmitting apparatus into parallel driving relation and operable to successively disconnect said reduced speed driving apparatus in the order of their speed reduction ratios.

6. A transmission for automobiles and other variable speed devices comprising a driving shaft, a driven shaft, a "low" gear mechanism, means for positively transmitting power between said shafts through said "low" gear mechanism, a "second" gear mechanism, electro-magnetic means for slippingly transmitting power between said shafts through said "second" gear mechanism, another electro-magnetic means for slippingly transmitting power directly between said shafts, means for connecting all of said power transmitting means into parallel driving relation at the "low" gear ratio, means for disconnecting said first mentioned means whereby said first electro-magnetic means and said other electro-magnetic means are jointly operable to transmit power between said shaft from the ratio of said "low" gear mechanism to the ratio of said "second" gear mechanism, means for disconnecting said first mentioned electro-magnetic means whereby said other electro-magnetic means is solely operable to transmit power between said shafts from the ratio of said "second" gear mechanism to approximate synchronism of driving and driven shafts.

7. In a transmission, a driving shaft, a driven shaft, a "low" gear mechanism including an overrunning clutch, means for positively transmitting power between said shafts through said "low" gear mechanism, a "second" gear mechanism including a second overrunning clutch, an induction torque unit for transmitting power between said shafts through said "second" gear mechanism, another induction torque unit for transmitting power directly between said shafts, said overrunning clutches being operable to connect and disconnect said positive means and said first induction unit into and out of driving relation with said other induction unit, the total torque on said driven shaft when both of said clutches are engaged being greater than that transmitted thereto by said positive means and said first induction unit through their respective gear mechanisms, the total torque on said driven shaft when said first mentioned overrunning clutch is disengaged and when said second overrunning clutch is engaged being greater than that transmitted thereto by said first induction unit through said "second" speed reduction mechanism, the total torque on said driven shaft when both of said clutches are disengaged being entirely that transmitted thereto by said other induction unit.

DAVID A. BARNETT.